(12) United States Patent
Winker et al.

(10) Patent No.: US 9,893,658 B2
(45) Date of Patent: Feb. 13, 2018

(54) METHOD FOR OPERATING A BRUSHLESS ELECTRIC MOTOR

(71) Applicant: Minebea Co., Ltd., Nagano-ken (JP)

(72) Inventors: Martin Winker, Wurmlingen (DE); Klaus Moosmann, Schramberg (DE)

(73) Assignee: MINEBEA CO., LTD., Nagano-Ken (JP)

( * ) Notice: Subject to any disclaimer, the term of this patent is extended or adjusted under 35 U.S.C. 154(b) by 0 days.

(21) Appl. No.: 13/854,295

(22) Filed: Apr. 1, 2013

(65) Prior Publication Data
US 2013/0257326 A1      Oct. 3, 2013

(30) Foreign Application Priority Data

Apr. 2, 2012   (DE) .................. 10 2012 102 868

(51) Int. Cl.
| | |
|---|---|
| H02P 6/14 | (2016.01) |
| H02P 6/18 | (2016.01) |
| H02P 6/20 | (2016.01) |
| H02P 6/182 | (2016.01) |
| H02P 6/21 | (2016.01) |

(52) U.S. Cl.
CPC .............. *H02P 6/205* (2013.01); *H02P 6/182* (2013.01); *H02P 6/20* (2013.01); *H02P 6/21* (2016.02)

(58) Field of Classification Search
CPC .......... H02P 6/182; H02P 6/18; F24F 11/0009
See application file for complete search history.

(56) References Cited

U.S. PATENT DOCUMENTS

| | | | | |
|---|---|---|---|---|
| 4,701,683 | A * | 10/1987 | Kikkawa ................ | H02P 6/085 318/293 |
| 5,017,845 | A * | 5/1991 | Carobolante et al. ... | 318/400.11 |
| 5,225,759 | A | 7/1993 | Endo et al. | |
| 5,397,972 | A * | 3/1995 | Maiocchi ................ | H02P 6/185 318/400.1 |
| 5,486,743 | A * | 1/1996 | Nagai ...................... | 318/400.13 |
| 5,789,895 | A * | 8/1998 | Lee .............................. | 318/811 |

(Continued)

FOREIGN PATENT DOCUMENTS

| | | |
|---|---|---|
| DE | 10338211 | 4/2004 |
| DE | 102004003153 | 8/2004 |

(Continued)

*Primary Examiner* — Eduardo Colon Santana
*Assistant Examiner* — Cortez Cook
(74) *Attorney, Agent, or Firm* — Volpe and Koenig, P.C.

(57) ABSTRACT

A method for starting a multiphase, sensorless commutated, brushless electric motor. The method has three operating phases. A start-up phase in which the motor is operated from a standstill with specified commutation times. An acceleration phase in which the motor is accelerated up to a nominal speed, wherein the commutation times are determined on the basis of the zero crossings of the BEMF voltage of the non-energized stator phase windings. And a stationary operating phase in which the nominal speed is kept constant. The transition from the start-up phase into the acceleration phase takes place when, during the start-up phase, a predetermined number of successive zero crossings of the BEMF voltage in the expected order in the expected motor phases have been identified. The transition from the acceleration phase into the stationary phase takes place once the nominal speed has been reached.

9 Claims, 2 Drawing Sheets

(56) References Cited

U.S. PATENT DOCUMENTS

| | | | |
|---|---|---|---|
| 6,504,328 B1* | 1/2003 | Gontowski, Jr. | 318/400.25 |
| 2004/0251861 A1* | 12/2004 | Tieu | G11B 19/2054 318/276 |
| 2004/0263104 A1* | 12/2004 | Iwanaga | H02P 6/182 318/400.35 |
| 2008/0224641 A1* | 9/2008 | Hoogzaad | H02P 6/182 318/400.34 |
| 2010/0134060 A1* | 6/2010 | Vermeir | H02P 6/182 318/400.32 |
| 2011/0074327 A1* | 3/2011 | Paintz | H02P 6/182 318/400.35 |
| 2011/0241582 A1* | 10/2011 | Maier | H02P 6/16 318/400.04 |

FOREIGN PATENT DOCUMENTS

| | | |
|---|---|---|
| DE | 102010008500 | 9/2010 |
| DE | 102009015690 | 10/2010 |

* cited by examiner

METHOD FOR OPERATING A BRUSHLESS ELECTRIC MOTOR

INCORPORATION BY REFERRENCE

The following documents are incorporated herein by reference as if fully set forth: German Patent Application No. 102012102868.0, filed Apr. 2, 2012.

BACKGROUND

The invention relates to a method for starting a multiphase, sensorless commutated, brushless electric motor.

A brushless electric motor (brushless direct current motor or BLDC motor) generally has a plurality of position sensors with whose aid the commutation times of the individual motor phases can be determined at all times. The position information of these sensors is already available at a standstill, i.e. before the first rotation has begun. This means that the BLDC motor having position sensors can always be started and commutated in strict accordance with the position information of the sensors.

However, a BLDC motor may also be operated without position sensors. Here, the BEMF (back electromotive force) voltage is used for determining the position. This BEMF voltage represents a voltage induced by the permanent magnetic rotor that, on rotation of the rotor (i.e. not at a standstill), occurs at the stator phases and that can be measured in the respective non-energized phase. Commutation then takes place subject to the zero crossings of the BEMF. On starting the motor and at low rotational speeds, it is not yet possible to reliably determine such a BEMF zero crossing. Thus for its start up, the motor has to be initially commutated without any position information. Consequently for start up, the BLDC motor is preferably controlled with specified commutation times like a stepping motor. Here, however, the efficiency is low.

Moreover, it is particularly difficult to determine or to ensure that the rotor does not omit a commutation step. In other words, that the rotor continues to turn with each commutation step and in particular does not block. This is particularly important for applications in which the BLDC motor drives a path-dependent position or actuating drive and an internal travel counter counts the commutation steps. If the motor blocks unrecognized, the internal travel counter shows a difference to the actual travel position of the actuator, which is critical for its operation and must thus be avoided at all costs.

SUMMARY

It is thus the object of the invention to create a BLDC motor or respectively a method for starting a BLDC motor in which uniform acceleration is achieved and in which there is no step loss particularly at the start-up phase, i.e. any blocking of the rotor is rapidly and reliably identified.

This object has been achieved by a method as well as by a BLDC motor according to one or more features of the invention. Further advantageous embodiments of the invention are described below and in the claims.

According to an embodiment of the invention, the start-up process is divided into three operating phases in which the motor is basically controlled in a different way and which are run through in succession.

In a first start-up phase, the motor is operated like a stepping motor with predetermined commutation times. These commutation times are stored, for example, in a table in the motor control. It is then expedient if the motor current is constantly regulated to a pre-defined value. This goes to ensure that the rotor accurately follows the applied rotary field and that the maximum possible torque of the actuator is also not exceeded. Ideally the motor thus has a constant acceleration torque and the rotational speed increases linearly.

The commutation times are calculated or determined such that a constant acceleration of the motor takes place.

In the start-up phase, the motor phases are moreover monitored for BEMF zero crossings. As soon as a specified number of valid BEMF zero crossings is registered, the motor control moves into the second operating phase, the acceleration phase. Here it is expedient if not only the number of zero crossings of the BEMF voltage are counted, but also if it is verified that the zero crossings of the BEMF voltage appear in the correct order in the expected motor phases.

By switching off a previously energized motor phase, a short voltage pulse with inverted polarity, called a flyback pulse, is generated due to the stored current in the phase inductors of the motor. To avoid confusion of such flyback pulses with the detection of zero crossings of the BEMF voltage, the motor control preferably has dynamic flyback pulse blanking to ensure reliable detection of the zero crossings of the BEMF voltage. This is necessary since after a commutation, the flyback pulses cannot generally be differentiated in the circuit for zero crossing detection from the next valid zero crossing. They have to be blanked at all costs. Since the length of the flyback pulses may vary according to the inductance, rotational speed and current, the motor control uses dynamic flyback pulse blanking so as to make available the maximum detection time of the actual zero crossings. This generally prevents a zero crossing from being missed due, for example, to excessively long flyback pulses. Should this be the case, however, automatic resumption of the commutations can often effectively prevent the motor from falling out of step. This goes to improve the detection of zero crossings of the BEMF voltage, making it possible to leave the start-up phase more rapidly.

Any blocking of the motor is detected in this phase either through a sudden increase in the motor current and/or the comparison of the number of pulses of a Hall sensor or any other rotary pulse encoder with the number of commutation steps. This makes it possible to reliably detect any blocking after only a few commutation steps.

In the acceleration phase, the BEMF zero crossings, i.e. the zero crossings of the BEMF voltages of the non-energized phase windings, are available as position feedback for commutation, so that here the BLDC motor can be operated in a sensorless mode, i.e. the commutation times are determined by the zero crossings of the BEMF voltage induced in the non-energized stator phases. The ideal commutation times lie in the middle between two adjacent zero crossings of the BEMF voltage. Directly after the transition from the start-up phase, in which the electric motor was force commutated, to the acceleration phase, in which the zero crossings of the BEMF voltage is used for commutation, the motor is preferably commutated directly after a detected zero crossing of the BEMF voltage. This corresponds to a pre-commutation of 30 electrical degrees for a 3-phase motor. Then during the stationary phase, for optimizing the efficiency and operating reliability of the motor, the commutation time is moved in the direction of the ideal commutation times, i.e. pre-commutation is less than 30 electrical degrees, but remains greater than zero electrical degrees. This is referred to as dynamic pre-commutation since commutation occurs earlier, so as to compensate, for example, the finite rise rate of the current in a motor phase.

Here, rotational speed control takes place, the motor current being limited to a predetermined maximum value. The rotational speed is preferably brought as quickly as possible up to the nominal speed, where current limitation in particular limits acceleration as well. The rotational speed control is preferably made defensive so that no overshooting of the rotational speed occurs. The acceleration limited by the current limitation also helps to simplify the design of the rotational speed regulator. Any blocking of the rotor is detected when a specific current value is exceeded or by the comparison of the number of rotary pulses of a position encoder with the number of commutations.

When the nominal speed has been reached, the motor control moves into a stationary operating phase in which the rotational speed is kept constant. Limiting the current in the stationary mode is no longer absolutely necessary, but may take place anyway. To detect any blocking, the attainment of a critical block current value is again used and/or the comparison of the number of rotary encoder pulses with the number of commutations, as well as the omission of the BEMF zero crossing after a specific time.

BRIEF DESCRIPTION OF THE DRAWINGS

The invention is explained in more detail below on the basis of an embodiment with reference to the enclosed drawings.

The drawings show.

DETAILED DESCRIPTION OF THE PREFERRED EMBODIMENTS

Figure 1:
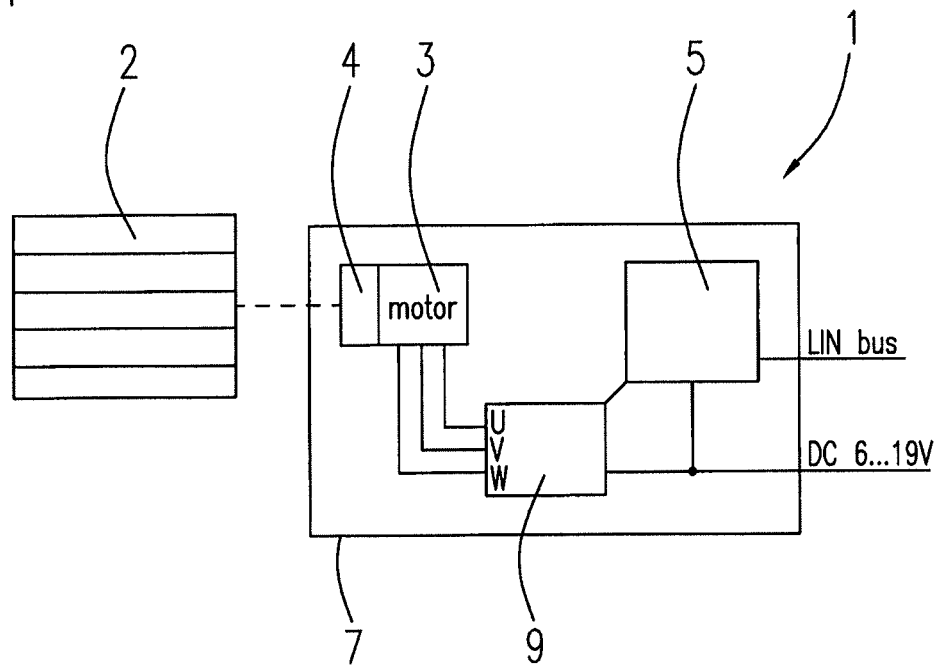
FIG. 1 an actuator for controlling an air flap in a motor vehicle.

An embodiment of the invention is explained on the basis of an actuator 1 that is used for controlling air flaps 2 in a motor vehicle (FIG. 1). It is of course clear that the invention is in no way limited to this application and can be used in many other applications without any further changes.

The actuator 1 is a fully integrated solution in which a drive motor 3, a transmission 4 and the control electronics 5 together with a microcontroller 6 are disposed in a water- and dust-proof housing 7. Owing to its application in a motor vehicle, the actuator 1 is subject to a series of requirements that can only be realized by this integrated design.

Figure 2:
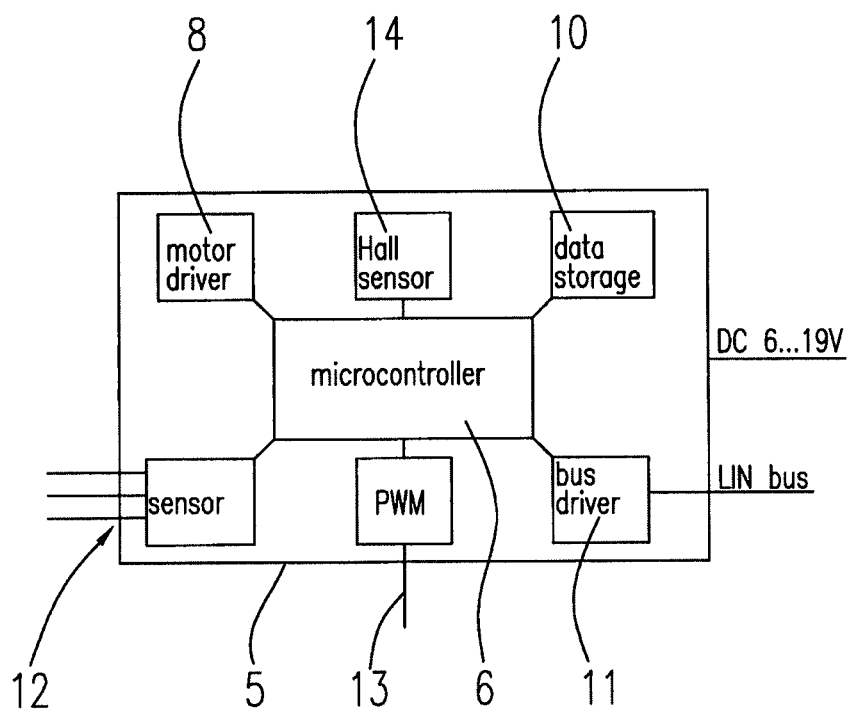
FIG. 2 a schematically represented control circuit of the brushless electric motor according to an embodiment of the invention, FIG. 3 a diagram that shows the three operating phases as a function of the rotational speed and time, and FIG. 4 a diagram with the commutation times and the rotational speed of the motor in the start-up phase.

The drive motor 3 is a brushless electric motor that is controlled via a motor driver 8 having a switching bridge 9. The motor driver 8 (FIG. 2) forms a part of the control of this switching bridge 9 which in turn is regulated or controlled by the microcontroller 6 (FIG. 2). The motor has a permanent magnetic rotor having, for example, 6 or 12 magnetic rotor poles and a stator provided with multiphase (here 3-phase) windings having, for example, 9 stator poles.

As part of the operating program, the microcontroller 6 (FIG. 2) contains the motor control or motor regulator needed for controlling the motor 3. An additional requirement for operation in a motor vehicle is that the microcontroller 6 recognizes and protocols error statuses. The operating program and the error data are stored in the data memory 10 of the microcontroller 6.

The microcontroller 6 is designed such that it can be directly operated at any voltages up to 19 V DC (for a short time also up to 45 V DC), so that an extra voltage converter is not necessary. Moreover, all components required for operation are integrated in the control circuit 5 including a LIN interface 11, further interfaces, for instance, to external sensors 12 (position, temperature or current sensors), the motor driver 8, the data memory (e.g. ROM, flash memory, EEPROM), PWM interface 13 and digital JO interface. The actuator 1 particularly has a LIN bus interface 11 as well as a corresponding bus driver 17, as used, for example, in motor vehicle construction. The control circuit can be configured and any errors displayed via this bus.

The electric motor is controlled without using sensors, with position sensors being the main ones that can be dispensed with. The control circuit 5 has preferably only one single Hall sensor 14 which makes it possible to determine whether the motor 3 is rotating and, moreover, can be used to recognize step losses. For example, for a motor having only one single Hall sensor and 6 magnetic rotor poles, a change in the Hall signal takes place every 60 mechanical degrees.

All the components of the control electronics are preferably located on one side of the circuit board. In particular, the circuit board is disposed so close to the drive motor 3 that the Hall sensor 14 can likewise be disposed on the circuit board of the control electronics 5. This allows the back of the circuit board to be largely designed, if not fully designed, as a grounding surface and thus as an extra cooling surface and as electrical shielding.

The control electronics 5 have comprehensive control and diagnostic functions. They can independently identify and evaluate electrical failures and deviations from operating parameters, such as under- or overvoltages, temperature, overcurrent as well as deviations in the behavior of the actuator, and then to protect itself where required, and on the command of a bus master, to report error situations. For this purpose, it can contain further sensors, or other sensors can be controlled via the interface 12.

The air flaps on the motor vehicle are not permanently in motion. In other words, the drive motor is at a standstill for most of the time. As soon as it is necessary to move the air flaps, the drive motor is switched on. Here, it is important for the movement of the air flaps to be consistent and uniform. It is thus necessary for the motor to reach its full torque from the start and to quickly reach its nominal speed in a controlled way.

This is why, according to an embodiment of the invention, the start-up process of the motor is divided into two operating phases in which the motor is controlled in a different way so as to achieve the most uniform acceleration possible.

Figure 3:
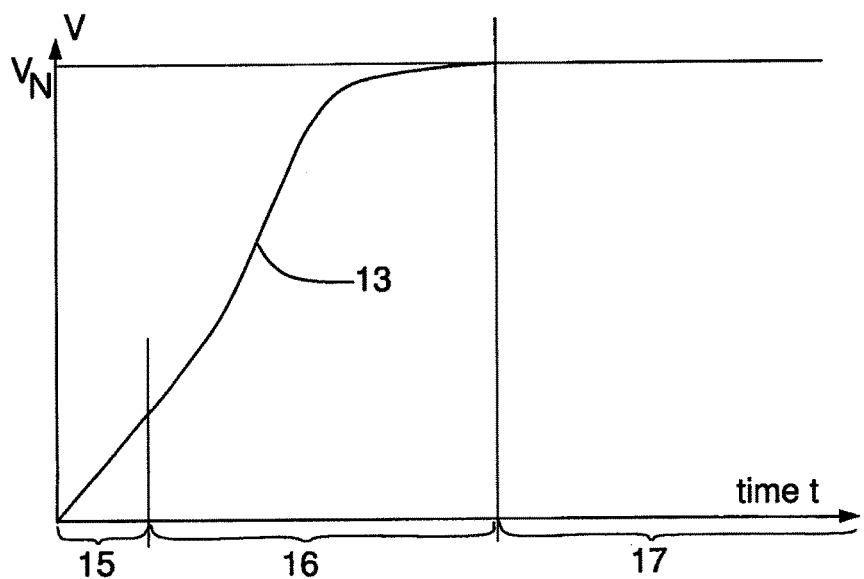

As is made clear in FIG. 3, after the motor has been started the two operating phases are run through in succession.

When the motor is started, it is immediately in the first operating phase, the start-up phase 15. In this start-up phase, the drive motor is operated with a specified commutation (also referred to as forced commutation since the commutation is "forced" on the motor) that corresponds to the operation of a stepping motor. For this purpose, the control circuit has, for example, a table with specified commutation times. At the same time, the motor current is regulated to a defined value so as to achieve a constant acceleration torque. The rotational speed of the motor thereby increases linearly, as shown in the diagram.

In the example, the table with the commutation times is precisely adapted to the motor used. The defined connection of the motor phases to the microcontroller and a fixed commutation sequence allow the rotational direction of the motor to be defined. By applying a defined holding torque by energizing two phase windings while at a standstill, the starting position of the motor is also defined. For starting the motor, based on the starting position and the commutation sequence stored in a commutation table, the motor phases are activated. The commutation table is stored in the data memory 10 of the microcontroller 6.

On calculating the commutation times, moreover, a constant acceleration is assumed, thus producing a linear increase in speed. This means that on calculating the next commutation time, account is taken of how fast the motor will be at this point in time on the basis of the current acceleration, to ensure that the linear rotational speed waveform is achieved.

This leads to the calculation of the commutation times, i.e. the period of time $t_k(t)$ between two commutation steps, based on the formula $$t_k(t) = -\frac{t}{2} + \sqrt{\left(\frac{t}{2}\right)^2 + \frac{10}{a \cdot p}},$$

where t is the sum of all previous commutation times $t_k$, a is the desired angular acceleration in rpm/s and p is the number of magnetic rotor pole pairs (rpm=round per minute). This root function can only be calculated in a simple microcontroller using a complicated numerical approximation procedure, which is why the commutation times are preferably pre-calculated and stored in a table in the data memory 10 of the microcontroller 6.

Figure 4:
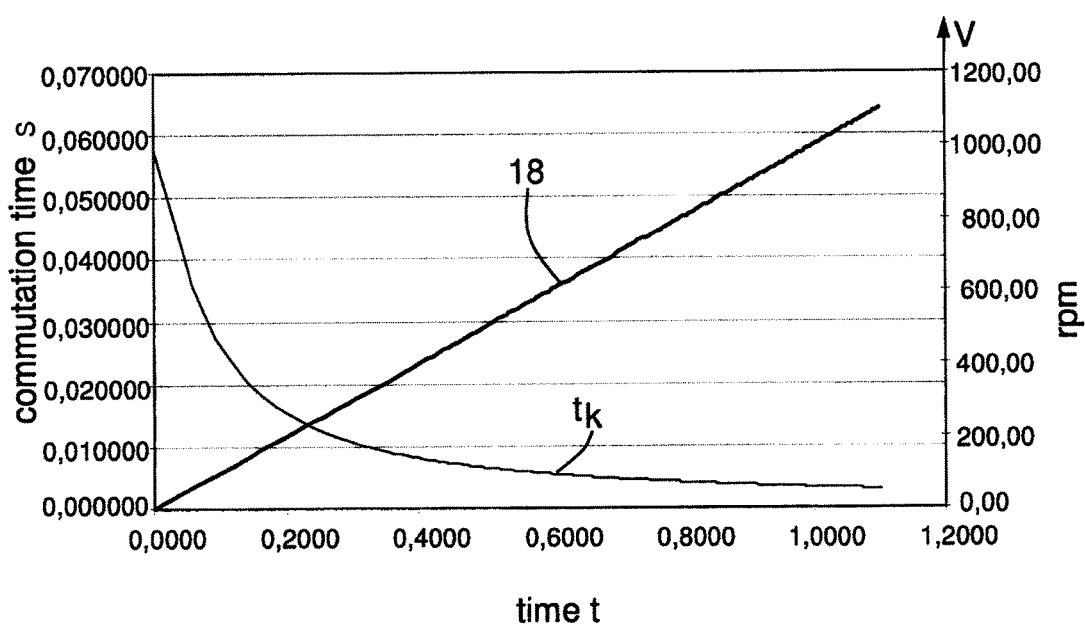

FIG. 4 shows a diagram for the waveform of the commutation times $t_k$ and the resulting rotational speed 18 of the motor, which increases linearly as desired, while the commutation times $t_k$ become shorter in accordance with the root function. In the example, a motor having p=3 magnetic rotor pole pairs and an angle acceleration of a=1000 rpm/s is assumed.

During this start-up phase, the BEMF voltage detection is already active. Due to the current commutation, the motor control knows its current non-energized phase. It expects the next zero crossing of the BEMF voltage in this phase. Since only this phase is monitored and the flyback pulse is blanked by dynamic flyback pulse blanking, detection is more robust and more reliable and a plausibility check of a correct sequence of zero crossings of the BEMF voltages takes place automatically.

As soon as the motor control has detected and counted preferably three plausible, successive zero crossings of the BEMF voltage, it is assumed that the motor has achieved sufficient rotational speed, so that from now on all further zero crossings of the BEMF voltage can be reliably detected. It is important that a number of, for example, three zero crossings occur in succession in the expected order in the expected motor phases. A different number of zero crossings than three may also be specified as a condition.

In addition, the actuator according to an embodiment of the invention has a Hall sensor 14. On the basis of the number of Hall pulses and the number of commutation steps, the motor control can easily determine whether the rotor follows the commutation or is blocked. In this way, any blocking can be reliably detected on the basis of an unexpected difference between the commutation steps and the Hall pulses within a few commutation steps and the motor is not energized any longer.

The start-up phase 15 generally comprises some 10 to 15 commutation steps, corresponding to about 1 to 2 motor rotations. The number of commutation times $t_k$ to be stored in the data memory 10 is thus not very large.

As soon as this condition of, for example, three plausible zero crossings of the BEMF voltages has been met, the motor control moves into the second operating phase, the acceleration phase 16. In this second operating phase, commutation takes place without sensors using exclusively the position information that is gained from the zero crossings of the BEMF voltage. Here, the aim is to accelerate the rotational speed 18 as quickly as possible up to the nominal speed $V_N$.

To achieve this, the motor control operates in the acceleration phase 16 with speed control, the motor current being nevertheless limited. Immediately after the transition from the start-up phase 15 into the acceleration phase 16, for two mechanical rotations of the motor, for example, commutation initially takes place directly after the measured zero crossing of the BEMF voltage. Then a pre-commutation takes place at a constant time with respect to the ideal commutation time (midway between two zero crossings of the BEMF voltage). In the example, this pre-commutation time is 100 µs. However, a different pre-commutation time is possible in this phase. It is preferably if the commutation is changed in small steps from a pre-commutation at 30 electrical degrees to the desired pre-commutation of between zero degrees and 15 electrical degrees.

The rotational speed control and the current limitation makes it possible to increase the rotational speed quickly to the nominal speed $V_N$ without any overshoots. When the nominal speed $V_N$ has been reached, the motor control finally moves into the stationary operating phase 17 in which the motor control operates with current and rotational speed control. This makes it possible to keep the rotational speed of the BLDC motor constant even under variable loads.

IDENTIFICATION REFERENCE LIST

1 Actuator
2 Air flaps
3 Drive motor
4 Transmission
5 Control electronics
6 Microcontroller
7 Housing
8 Motor driver
9 Bridge circuit
10 Data memory
11 LIN bus interface
12 Sensor interface
13 PWM interface
14 Hall sensor
15 Start-up phase
16 Acceleration phase
17 Stationary operating phase
18 Rotational speed
V Rotational speed axis
$V_N$ Nominal speed
t Time axis
$t_k$ Commutation time

The invention claimed is:

1. A method for operating a multiphase, sensorless commutated, brushless electric motor, wherein the method has three operating phases, comprising:

performing a start-up phase in which the motor is operated from a standstill with specified commutation times;

performing an acceleration phase in which the motor is accelerated up to a nominal speed, wherein the commutation times are determined on a basis of zero crossings of a BEMF voltage of non-energized stator phase windings; and performing a stationary operating phase in which the nominal speed is kept constant, wherein transitioning from the start-up phase into the acceleration phase takes place when, during the start-up phase, a predetermined number of successive zero crossings of the BEMF voltage in an expected order in expected motor phases have been identified and transitioning from the acceleration phase into the stationary phase takes place once the nominal speed has been reached, and wherein at least at a beginning of the acceleration phase the motor is operated with a pre-commutation of between 20 electrical degrees and 30 electrical degrees in comparison to a commutation time in the middle between two adjacent zero crossings of the BEMF voltage, wherein dynamic flyback pulse blanking is used when identifying zero crossings of the BEMF voltage.

2. A method according to claim 1, further comprising, during the start-up phase, performing current control to a specified current value.

3. A method according to claim 1, further comprising, during the acceleration phase, performing rotational speed control in which a motor current is limited to a maximum value.

4. A method according to claim 1, wherein any blocking of the motor is detected through monitoring of a motor current.

5. A method according to claim 1, wherein to detect any blocking, a signal of a rotary pulse encoder is additionally evaluated and a number of signal changes is compared to a number of commutation pulses.

6. A method according to claim 1, further comprising, during the stationary operating phase, performing current and rotational speed control.

7. A method according to claim 1, wherein commutation times are pre-calculated and stored in a table.

8. A method according to claim 1, wherein commutation times are calculated for producing a constant acceleration of the motor during the start-up phase.

9. A multiphase, sensorless commutated, brushless electric motor, wherein said motor is configured to operate according to the method of claim 1.

* * * * *